United States Patent [19]

Wooten et al.

[11] 4,209,478

[45] Jun. 24, 1980

[54] METHOD OF SINTERING CERAMICS

[75] Inventors: John R. Wooten, Thousand Oaks; Harry W. Carpenter, Northridge; Edwin F. C. Cain, Canoga Park, all of Calif.

[73] Assignee: Rockwell International Corporation, El Segundo, Calif.

[21] Appl. No.: 934,113

[22] Filed: Aug. 16, 1978

[51] Int. Cl.² .................... C04B 35/58; C04B 35/60
[52] U.S. Cl. ........................................ 264/65; 106/44; 264/66; 264/332; 264/338
[58] Field of Search ............... 264/65, 56, 332, 338, 264/66; 106/44, 39.5

[56] References Cited

U.S. PATENT DOCUMENTS

| 4,017,319 | 4/1977 | Greskovich et al. | 264/65 |
| 4,073,845 | 2/1978 | Buljan et al. | 264/65 |
| 4,087,500 | 5/1978 | Fisher et al. | 264/65 |
| 4,110,084 | 8/1978 | Lee et al. | 264/65 |
| 4,119,690 | 10/1978 | Prochazka et al. | 264/65 |

*Primary Examiner*—Donald J. Arnold
*Attorney, Agent, or Firm*—L. Lee Humphries; Robert M. Sperry

[57] ABSTRACT

A compact is surrounded by a compatible, nonsinterable powder within a container with a layer of sinterable powder disposed on top of the nonsinterable powder and placed in a sintering oven. During sintering, the sinterable powder forms a cover that retards decomposition of the compact and serves to enhance densification of the compact.

16 Claims, 1 Drawing Figure

U.S. Patent  Jun. 24, 1980  4,209,478
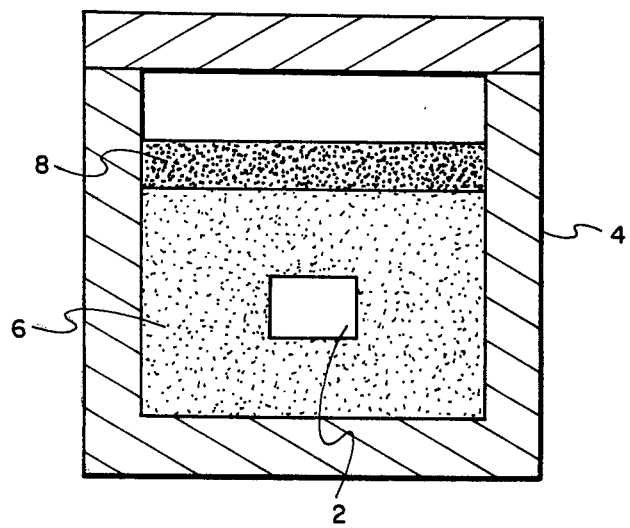

METHOD OF SINTERING CERAMICS

BACKGROUND OF THE INVENTION

1. Field of the Invention

This invention relates to material processing and particularly to methods of sintering ceramics, cermets, powdered metals and the like to enhance densification.

2. Prior Art

Certain covalent compounds, which have either low thermal expansion or high thermal conductivity, have been shown to exhibit desirable thermal shock characteristics. Typical of such compounds are silicon-based, nonoxide ceramics, such as $Si_3N_4$ or SiC. Unfortunately, these materials have, heretofore, been extremely difficult to fabricate. Until recently, engineering components made of silicon-based, nonoxide ceramics were fabricated either by hot pressing or reaction sintering. However, reaction sintering forms a microstructure which precludes achievement of high strength and allows internal oxidation that eventually leads to cracking. Hot pressed silicon-based, nonoxide ceramics are strong and oxidation resistant, but hot pressing is an expensive fabrication technique and virtually eliminates the fabrication of complex shaped components.

Recently, silicon-based, nonoxide ceramics have been fabricated by cold compaction and sintering. These compounds generally are sintered with small amounts of $Al_2O_3$, as well as other sintering aids, i.e. MgO, $Y_2O_3$, etc. The $Al_2O_3$ addition tends to improve the densification while reducing the weight loss during sintering by the formation of a low temperature glassy phase. However, the high temperature characteristics of the silicon-based, nonoxide ceramics are seriously degraded by the addition of such $Al_2O_3$. Also, recently silicon-based nonoxide ceramics have been sintered under high pressure. However, this has been done only on a small scale.

BRIEF SUMMARY AND OBJECTS OF THE INVENTION

These disadvantages of the prior art are overcome with the present invention and a method of processing silicon-based, nonoxide ceramics is proposed which permits sintering of silicon-based, nonoxide ceramics, without requiring the addition of $Al_2O_3$ or the use of high gas pressures to achieve near theoretical densification with minimal weight loss. The advantages of the present invention are preferably attained by forming a compact, composed of a sinterable silicon-based, nonoxide ceramic, by means of injection molding or other suitable forming methods, surrounding the compact with a compatible, nonsinterable powder within a container placed in a sintering oven, disposing a cover of sinterable silicon-based, nonoxide material above the compact to retard decomposition and enhance densification of the compact.

Accordingly, it is an object of the present invention to provide improved methods for processing ceramics.

Another object of the present invention is to provide a method for enhancing densification and retarding decomposition of silicon-based, nonoxide ceramics.

An additional object of the present invention is to provide an improved method for sintering silicon-based, nonoxide ceramics.

A specific object of the present invention is to provide a method for processing silicon-based, nonoxide ceramics comprising the steps of forming a compact composed of a sinterable silicon-based, nonoxide ceramic, placing said compact within a container, disposing a cover of sinterable silicon-based, nonoxide material above the compact, placing the container in a sintering oven, and sintering said compact.

These and other objects and features of the present invention will be apparent from the following detailed description.

BRIEF DESCRIPTION OF DRAWING

The FIGURE is a diagrammatic representation showing a compact being sintered in accordance with the present invention.

DETAILED DESCRIPTION OF THE INVENTION

In those forms of the present invention chosen for purposes of illustration, the drawing shows a compact 2 formed in any suitable manner, such as press forming, injection molding, etc. The compact 2 is composed of $Si_3N_4$ containing up to and above 20 weight percent of a sintering aid, such as $CeO_2$, $SiO_2$, MgO, $Y_2O_3$ or the like.

As seen in the drawing, the compact 2 is placed within a crucible 4, formed of any suitable material and is surrounded by a compatible, nonsinterable powder 6, such as $Si_3N_4$ having no sintering aid material. A cover 8 of sinterable, compatible material is disposed above the compact 2 in a suitable manner. One convenient method is to spread it across the powder 6. The cover 8 may be composed of uncompacted powder which is identical in composition to the compact 2. The crucible 4 is, then, placed in a suitable sintering oven and is sintered at a suitable temperature. The sintering is preferably performed in an inert environment at a pressure of about one atmosphere. The decomposition reaction of the $Si_3N_4$ during sintering is not completely understood, but is believed to involve one or more of the following reactions:

2 $Si_3N_4$ (s)→6 SiN(g)+$N_2$(g)
4 $Si_3N_4$ (s)→6 $Si_2$N(g)+5 $N_2$(g)
4 $Si_3N_4$ (s)→3 Si(g)+2 $N_2$(g)
2 $Si_3N_4$ (s)→3 $Si_2$(g)+4 $N_2$(g)
2 $Si_3N_4$ (s)→Si(g)+2 $N_2$(g)

From this reaction, it would be expected that densification would be enhanced by sintering in an inert environment under high pressure and, indeed, such has been the practice of the prior art. However, sintering in a high pressure environment requires bulky and expensive equipment and exposes workers to possible hazards from explosion and the like.

In accordance with the present invention, it has been found that the advantages of inert, high pressure sintering can be achieved, without the attendant hazards, by utilizing the arrangement illustrated in the drawing. One method is when the cover 8 is composed of a layer of powder, the furnace temperature is raised rapidly to a temperature above the glass formation temperature of the material of the cover layer 8. This temperature is held for a brief period to cause preliminary consolidation of the material of the cover layer 8. Thereafter, the furnace temperature is reduced to the normal sintering temperature and is held for an appropriate period of time to permit sintering of the compact 2.

In a typical example, where the compact 2 was an injection molded turbine blade, formed of $Si_3N_4$ plus about 20 weight percent of $CeO_2$, the compact 2 was placed in a graphite crucible 4, and was surrounded by $Si_3N_4$ powder, containing no sintering aid 6. A cover layer 8 of powdered $Si_3N_4$, containing about 20 weight percent of $CeO_2$, was disposed above the powder 6 within the crucible 4. The crucible 4 was placed in a sintering oven and a nitrogen environment at about one atmosphere was established within the oven. The temperature in the oven was raised to about 1770° C. and was held at that level for about five minutes. Thereafter, the temperature in the oven was reduced to about 1725° C. to 1750° C. for a period of about one hour. The resulting turbine blades were found to have undergone negligible weight loss and to have densities greater than 95% of theoretical. The blade material exhibited excellent room temperature properties, having flexure strengths of 80,000 psi to 120,000 psi.

Obviously, numerous variations and modifications may be made without departing from the present invention. Accordingly, it should be clearly understood that the forms of the present invention described above are illustrative only and are not intended to limit the scope of the present invention.

It will, of course, be realized that various modifications can be made in the design and operation of the present invention without departing from the spirit thereof. Thus, while the principal, preferred construction, and mode of operation of the invention have been explained, and what is now considered to represent its best embodiment has been illustrated and described, it should be understood that within the scope of the appended claims the invention may be practiced otherwise than as specifically illustrated and described.

We claim:

1. A method of manufacturing ceramic articles, said method comprising the steps of:
    forming a compact comprising a ceramic material and a sintering aid;
    surrounding said compact with powder comprising a nonsinterable material, which is compatible with the material of said compact;
    disposing above said powder a cover layer; composed of a sinterable material, which is compatible with the material of said compact; and
    sintering said compact under a pressure of about 0.5–2 atmospheres.

2. The method of claim 1 wherein said sintering step comprises:
    initially heating said materials to a first temperature above the fusion temperature of said sinterable material,
    maintaining said first temperature for a period sufficient to cause at least partial sintering of said sinterable material, and
    subsequently reducing the heat applied to said materials to a suitable sintering temperature for said compact.

3. The method of claim 1 wherein said sintering step is performed in an inert environment at a pressure of about one atmosphere.

4. The method of claim 3 wherein said inert environment is nitrogen.

5. The method of claim 3 wherein said inert environment is argon.

6. The method of claim 1 wherein said compact is formed of a covalent compound which decomposes during heating.

7. The method of claim 1 wherein said compact is a silicon-based, nonoxide ceramic.

8. The method of claim 1 wherein said compact consists of about 80 weight percent of a silicon-based, nonoxide ceramic and to about 20 weight percent of a sintering aid.

9. The method of claim 7 wherein said ceramic is $Si_3N_4$.

10. The method of claim 7 wherein said ceramic is SiC.

11. The method of claim 8 wherein said sintering aid is selected from the group consisting of $CeO_2$, MgO, $SiO_2$, $Y_2O_3$, $ZrO_2$, $Al_2O_3$, AlN, $Mg_3N_2$, and $BeN_2$.

12. The method of claim 1 wherein said nonsinterable powder is a silicon-based, nonoxide ceramic containing no sintering aid.

13. The method of claim 1 wherein said cover layer is composed of uncompacted powder having a composition substantially identical to said compact.

14. The method of manufacturing ceramic articles, said method comprising the steps of:
    forming a compact comprising about 80 weight percent $Si_3N_4$ and about 20 weight percent $CeO_2$;
    surrounding said compact with $Si_3N_4$ powder containing no $CeO_2$;
    disposing above said powder a cover layer composed of uncompacted powder having a composition substantially identical with said compact;
    maintaining a pressure of about 0.5–2 atmospheres about said materials;
    heating said materials to a first temperature of about 1770 C.;
    maintaining said first temperature for about five minutes to cause at least partial fusion of said cover layer; and
    reducing the temperature to about 1750 C. for a period of about one hour to sinter said compact.

15. The method of claim 1 wherein said sintering step comprises:
    heating said materials to the fusion temperature of said sinterable material; and
    maintaining said temperature for a period sufficient to cause suitable densification of said compact.

16. A method of manufacturing ceramic articles, said method comprising the steps of:
    forming a compact comprising a ceramic material and a sintering aid;
    placing said compact in a crucible;
    placing a cover, composed of a material which is compatible with said compact, as a lid on said crucible above said compact; and
    sintering said compact at a pressure of about 0.5–2 atmospheres.

* * * * *